S. M. CLARK.
POWER-BELT.
No. 171,505. Patented Dec. 28, 1875.
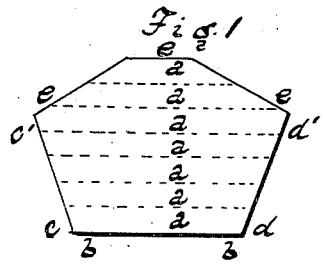
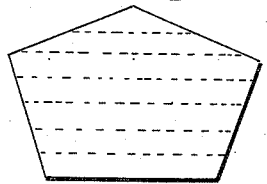 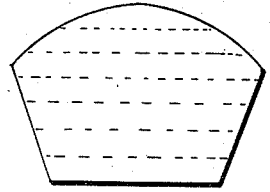
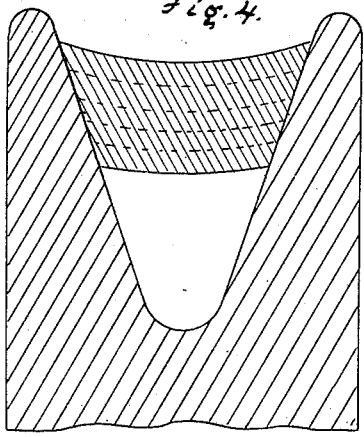
Witnesses.
John Pollitt
Edw? S. Bill
Inventor:
Spencer M. Clark
By W. E. Simonds
Att'y.

UNITED STATES PATENT OFFICE.

SPENCER M. CLARK, OF WASHINGTON, DISTRICT OF COLUMBIA.

IMPROVEMENT IN POWER-BELTS.

Specification forming part of Letters Patent No. 171,505, dated December 28, 1875; application filed July 2, 1875.

*To all whom it may concern:*

Be it known that I, SPENCER M. CLARK, of Washington, District of Columbia, have invented an Improvement in Power-Belts, of which the following is a specification, reference being had to the accompanying drawings, where—

Figure 1 is a view, in cross-section, of a belt embodying my invention. Figs. 2 and 3 are similar views of modified forms of the invention. Fig. 4 is an illustration hereinafter explained.

The invention appertains to the form of a power-belt for transmitting power and motion from one pulley to another.

Formerly it was the universal practice to use what are commonly termed "flat belts" for transmitting power and motion from pulley to pulley, and where great power was thus transmitted it was necessary to use a belt of great width. Such belts were exceedingly expensive because a single hide could furnish but one or two strips of leather of sufficient width, the remainder of the hide being thereby rendered useless, or of but little value for other and inferior purposes, and as the manufacturing interests of the country increased the consumption of these belts increased greatly, and the prices thereof enhanced still more rapidly. It was then attempted to use round belts running upon pulleys having round or angular grooves, and this attempt met with a measure of success.

Belts of other shapes, in cross-section, have since been devised and used, among them a belt trapezoidal in cross-section, and also a belt square, in cross-section, put upon the pulleys diamond-wise—so to speak.

In using the trapezoidal belt it has been found necessary to put small angular blocks at short intervals upon the inner face of the belt to keep it distended in proper shape, and to keep it from deflecting into the apex of the angular groove of the pulley. These blocks add to the cost of the belt without increasing its tensile or transmitting strength, and also cause the layers, of which the belt is composed, to weaken and break over the shoulders formed by the ends of the blocks.

The square belt, used diamond-wise, sinks to the apex of the angular groove in which it runs, if run in a groove of its own angle, and thereby fails to have the best degree of friction, and if run (as they sometimes are to prevent the belt from bottoming) in grooves of a more acute angle than ninety degrees, the adhesion is then mainly upon one side only, thus lessening its transmitting power.

My belt is like these improved and cheapened belts just mentioned, constructed of successive layers $a$ of belting, pegged, riveted, sewed, or otherwise fastened together properly, and is in cross-section in the form of the frusta of two cones, base to base; and of course may be either acute or obtuse angles, without changing the general design. The line $b\ b$ denotes the inner face; $c\ c'\ d\ d'$, angular sides, which fit into a corresponding angular groove of the pulley, and $e\ e\ e$ a backing on the outer face of the belt, which prevents the belt from bending down in the center under the strain put upon it in actual use, as happens to the trapezoidal belt when not supported by the blocks upon the inner face hereinbefore described—a failing illustrated in Fig. 4.

In belt of this construction no supporting blocks upon the inner face are needed, and the belt does not extend down to the apex of the angle, as does the square belt used diamond-wise. The advantages are obvious.

The particular angle or inclination of the sides $c\ c'\ d\ d'$ is not essential, nor is the shape of the backing $e\ e\ e$, of which I show modifications in Figs. 2 and 3, though I prefer that shown in Fig. 1.

The essential features are, first, that the sides or lines of contact with the pulley-groove shall be angular or inclined; and, second, that the belt shall have on the outer face, and above the lines of contact, the backing to prevent the breaking down of the belt centrally under the strain of actual work.

I claim as my invention—

A belt constructed of successive layers of belting material of different widths, which decrease in width from its widest point downward, forming an angle to fit the pulley, and from the same point upward to form a re-enforce or backing for the belt when under working tension, substantially as shown and described.

SPENCER M. CLARK.

Witnesses:
M. J. CLARK,
W. E. SIMONDS.